(12) United States Patent
Licht (10) Patent No.: US 11,434,574 B2
(45) Date of Patent: Sep. 6, 2022

(54) SYSTEM, METHOD AND COMPOSITION FOR MAKING THIN-WALLED CARBON NANOMATERIALS

(71) Applicant: C2CNT LLC, Venice, FL (US)

(72) Inventor: Stuart Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 0 days.

(21) Appl. No.: 17/243,510

(22) Filed: Apr. 28, 2021

(65) Prior Publication Data
US 2021/0340680 A1    Nov. 4, 2021

Related U.S. Application Data

(60) Provisional application No. 63/017,489, filed on Apr. 29, 2020.

(51) Int. Cl.
| | |
|---|---|
| *C25B 1/135* | (2021.01) |
| *B82Y 40/00* | (2011.01) |
| *C25B 11/046* | (2021.01) |

(52) U.S. Cl.
CPC ............ *C25B 1/135* (2021.01); *C25B 11/046* (2021.01); *B82Y 40/00* (2013.01)

(58) Field of Classification Search
CPC .................................. C25B 1/00; C25B 1/135
See application file for complete search history.

(56) References Cited

U.S. PATENT DOCUMENTS

| | | | |
|---|---|---|---|
| 9,730,491 B2* | 8/2017 | Hsieh .................. | A43B 23/086 |
| 2011/0100832 A1* | 5/2011 | Lubomirsky ............ | C25B 1/02 |
| | | | 205/349 |
| 2011/0168425 A1* | 7/2011 | Basfar .................... | H01B 7/295 |
| | | | 524/436 |
| 2012/0230908 A1* | 9/2012 | Ohashi .................... | D01F 9/133 |
| | | | 977/843 |
| 2013/0199937 A1* | 8/2013 | Cole ....................... | C25B 3/25 |
| | | | 205/351 |
| 2018/0127885 A1* | 5/2018 | Krause ..................... | C25B 3/25 |
| 2019/0271088 A1 | 9/2019 | Licht | |
| 2020/0032404 A1 | 1/2020 | Licht | |

(Continued)

FOREIGN PATENT DOCUMENTS

WO    WO-2018156642 A1 *    8/2018    ............ C01B 32/15

OTHER PUBLICATIONS

Licht et al. "Calcium metaborate induced thin walled carbon nanotube syntheses from CO2 by molten carbonate electrolysis," Scientific Reports (2020) 10:15146. (Year: 2020).*

(Continued)

*Primary Examiner* — Nicholas A Smith (74) *Attorney, Agent, or Firm* — Chamberlain, Hrdlicka, White, Williams & Aughtry (57) ABSTRACT

The present disclosure relates to thin-walled carbon nanomaterial, such as thin-walled carbon nanotubes, and systems, methods and compositions for production thereof. The method for producing a thin walled carbon nanotube comprises heating a carbonate electrolyte to obtain a molten carbonate electrolyte; disposing the molten carbonate electrolyte between an anode and a cathode in a cell; applying an electrical current to the cathode and the anode in the cell; and, limiting a diameter of the carbon nanomaterial.

28 Claims, 5 Drawing Sheets

(56) References Cited

U.S. PATENT DOCUMENTS

2021/0079543 A1* 3/2021 Mikoshiba ............... C25B 9/73

OTHER PUBLICATIONS

Arcaro S et al., "MWCNTs produced by electrolysis of molten carbonate: Characteristics of the cathodic products grown on galvanized steel and nickel chrome electrodes", Applied Surface Science, vol. 466, Oct. 6, 2018, pp. 367-374.
Douglas Anna et al., "Iron catalyzed growth of crystalline multi-walled carbon nanotubes from ambient carbon dioxide mediated by molten carbonates", Carbon, vol. 116, Feb. 12, 2017, pp. 572-578.
Hongjun Wu et al., "Effect of molten carbonate composition on the generation of carbon material", RSC Advances, vol. 7, No. 14, Jan. 26, 2017, pp. 8467-8473.
International Search Report and Written Opinion of the International Searching Authority issued in corresponding PCT Application No. PCT/US2021/029732, dated Jul. 26, 2021, 13 pages.
Jiawen Ren et al., "Transformation of the greenhouse gas CO2 by molten electrolysis into a wide controlled selection of carbon nanotubes", Journal of CO2 Utilization, vol. 18, Mar. 19, 2017, pp. 335-344.

* cited by examiner

SYSTEM, METHOD AND COMPOSITION FOR MAKING THIN-WALLED CARBON NANOMATERIALS

CROSS-REFERENCE TO RELATED APPLICATIONS

This application claims priority to and the benefit of U.S. Provisional Patent Application Ser. No. 63/017,489 filed on Apr. 29, 2020, which is hereby incorporated by reference in its entirety.

TECHNICAL FIELD

The present disclosure relates to making carbon nanostructures. In particular, the present disclosure relates to systems, methods and compositions for making thin-walled carbon nanostructures using a molten carbonate process.

BACKGROUND

Atmospheric carbon dioxide ($CO_2$) concentration has cycled at 235±about 50 ppm for about 400 millennia until around 1850. Currently atmospheric $CO_2$ concentration is at about 420 ppm and rising at a rapid annual rate. The increased concentration of $CO_2$ in the atmosphere is causing global planetary climate disruptions, habitat loss and various other threats to our planet. $CO_2$ was regarded as a stable molecule such that its transformation into a non-greenhouse gas now poses a significant challenge.

It is known that the increasing atmospheric concentration levels of $CO_2$ can be mitigated by the removal of $CO_2$ from the air and/or by lowering the rate of emission of $CO_2$ into the atmosphere. Technologies that are intended to remove $CO_2$ from the air that have been explored are costly, and/or water and energy intensive and demonstrate little incentive for long-storage of removed of $CO_2$. For example, concentrated $CO_2$ produced by the air-capture membrane technologies is currently used to make seltzer water, which re-releases the $CO_2$ when consumed. As another example, concentrated $CO_2$ produced by precipitation/calcination method is currently injected to release fossil fuels, which has a limited capacity for storage, leeches back to the air, and releases $CO_2$ to the air when the fossil fuels are consumed.

A third option for mitigating the increasing atmospheric concentration levels of $CO_2$ include conversion of $CO_2$ to carbon and oxygen by molten carbonate electrolysis. A useful product generated by this process includes carbon nanomaterials.

Carbon nanomaterials have great potential as a material resource, with applications ranging from reinforced composites, capacitors, lithium-ion batteries, nanoelectronics, and catalysts, to the principal component of lightweight, high strength building materials due to their characteristic superior strength, electrical and thermal conductivity, flexibility and durability.

SUMMARY

The present disclosure provides thin-walled carbon nanomaterials, and in particular thin-walled carbon nanotubes (CNTs), prepared by electrolytic splitting of $CO_2$ by molten carbonate electrolysis. Thin-walled CNTs can have several advantages compared to thick walled CNTs including a small diameter, which in turn leads to a greater surface area per unit mass. This greater surface-area per unit mass is advantageous in a variety of applications. For example, in lithium-ion (Li-ion) battery use in which a greater surface area CNT may be used as the cathode, which may result in improved Li ion intercalation, higher electrical storage capacity and more rapid charging due to intercalation rate enhancements. In Li ion battery cathodes, thin walled CNTs with greater surface area per unit mass may be used as additives to improve the electrical conductivity contact to both the current collector and the cathode. Similarly, the higher surface-area per unit mass of thin-walled CNTs provides high electrical storage in capacitors. Thin-walled CNTs may also provide more effective delivery of medicines, drugs or pharmacologic agents. The higher surface area per unit mass of thin-walled CNTs can also act as a scaffold to hold a variety of catalysts, including but not limited to platinum for fuel cells for increasing catalyst activity. Thin-walled CNTs may be advantageous in the dispersion of heat to act as fire retardants, and may also act as improned electromagnetic shields for blocking radiation. In addition to the greater surface-area per unit mass, thinner walls may provide a lower probability of defects in the CNT walls during production. Such defects are evident, for example, as missing carbon atoms or $sp^3$ instead of $sp^2$ bonds amongst carbon atoms. Fewer defects may increase the usefulness of CNT in electronic applications such as use in transistors, solar cells and flat-panel displays.

Some embodiments of the present disclosure relate to a system for making a thin-walled carbon nanomaterial (CNM). The system comprising an anode; a cathode; an inter-electrode space that is defined between the anode and the cathode; a carbonate electrolyte media positionable within the inter-electrode space, a source of current for applying a current density is at least 0.01 $A/cm^2$ across the electrodes (one cm equals about 0.39 inches); a source of heat configured to heat the electrolyte media to a temperature so as to create a molten electrolyte media; a diameter-limiting component that is mixable with the electrolyte media; and a source of carbon for introducing a carbon input into the inter-electrode space.

Some embodiments of the present disclosure relate to a method for producing a thin-walled CNM. The method comprising the steps of: heating a carbonate electrolyte to obtain a molten carbonate electrolyte; disposing the molten carbonate electrolyte between an anode and a cathode in a cell; applying an electrical current to the cathode and the anode in the cell; and, limiting the diameter of the CNM in the cell. In some embodiments of the present disclosure, the step of limiting the diameter of the CNM in the cell may be a step of applying the electrical current for a predetermined period of time, adding a diameter-limiting component into either the carbonate electrolyte or the molten carbonate electrolyte or combinations thereof.

Some embodiments of the present disclosure relate to a composition that is used in an electrosynthesis process for making a thin-walled CNM product. The composition comprising a carbonate electrolyte and a diameter-limiting component. The diameter limiting component may be pre-mixed with the carbonate electrolyte prior to heating or the diameter-limiting component may be added to the carbonate electrolyte after it is heated to a molten state.

Optionally, the embodiments of the present disclosure may further include step of selecting the nanomaterial morphology to create a CNM electrosynthesis product with thin walls and a greater proportion of one desired CNM morphology than others.

BRIEF DESCRIPTION OF THE DRAWINGS

FIG. 1 shows transmission electron microscope (TEM) images of carbon nanotube walls of carbon nanotubes (CNTs) synthesized, according to embodiments of the present disclosure, by 0.2 A cm² electrolysis in 770° C. Li₂CO₃ at a 5 cm² using a coiled copper wire with Ni powder; wherein FIG. 1A shows a CNT produced after 15 minutes; FIG. 1B shows a CNT produced after 30 minutes; FIG. 1C shows a CNT produced after 90 minutes; and, FIG. 1D shows further view of the CNT shown in FIG. 1C.

FIG. 3 shows images of electrolysis synthesis (referred to as electrosynthesis herein) CNT products, according to embodiments of the present disclosure, wherein FIGS. 3A and 3B are scanning electron microscope (SEM) images at a first SEM magnification; FIGS. 3C and 3D are SEM images at a second SEM magnification that is higher than the first SEM magnification; FIG. 3E is a TEM image taken at a first TEM magnification; FIG. 3F is at TEM image taken at a second TEM magnification that is higher than the first TEM magnification; FIG. 3G is a TEM image taken at a third TEM magnification that is higher than the second TEM magnification.

FIG. 4 shows further images of electrosynthesis CNT products, according to embodiments of the present disclosure, wherein FIGS. 4A and 4B are photographs of a cathode used in the electrosynthesis; FIG. 4C shows a TEM image of the CNT product taken at a fourth TEM magnification; FIG. 4D shows a TEM image of the CNT product taken at a fifth TEM magnification that is higher than the fourth TEM magnification; FIG. 4E shows a TEM image of the CNT product taken at a sixth TEM magnification that is higher than the fifth TEM magnification; and, FIG. 4F shows a TEM image of the CNT product taken at a seventh TEM magnification that is higher than the sixth TEM magnification.

DETAILED DESCRIPTION

Splitting carbon dioxide ($CO_2$) into carbon and oxygen by molten carbonate electrolysis can be achieved by using a molten carbonate electrolyte media and a variety of electrolytic configurations. The carbon product of the electrolytic synthesis process, also referred to herein as the electrosynthesis process, can be a substantially pure, or pure, carbon nanomaterials (CNMs) including carbon nanotubes (CNTs). The electrosynthesis process can transform $CO_2$ to CNMs by causing a mass transfer of carbon from a gas phase into the solid CNMs. For example, the carbon in the gas phase may take the form of $CO_2$ that may be directly captured $CO_2$ from the atmosphere or from concentrated anthropogenic $CO_2$ sources such as industrial waste-gas streams or reservoirs of sequestered $CO_2$.

The affinity for molten carbonates to absorb both atmospheric and flue gas levels of $CO_2$ has previously been demonstrated using 13C isotopic $CO_2$. $CO_2$ The net reaction is in accord with the following reactions:

Dissolution: $CO_2(gas)+Li_2O(soluble)\rightarrow Li_2CO_3$(molten)     (Eq. 1)

Electrolysis: $Li_2CO_3(molten)\rightarrow C(CNT)+Li_2O$(soluble)+$O_2$(gas)     (Eq. 2)

Net: $CO_2(gas)\rightarrow C(CNT)+O_2(gas)$     (Eq. 3)

Figure 1:
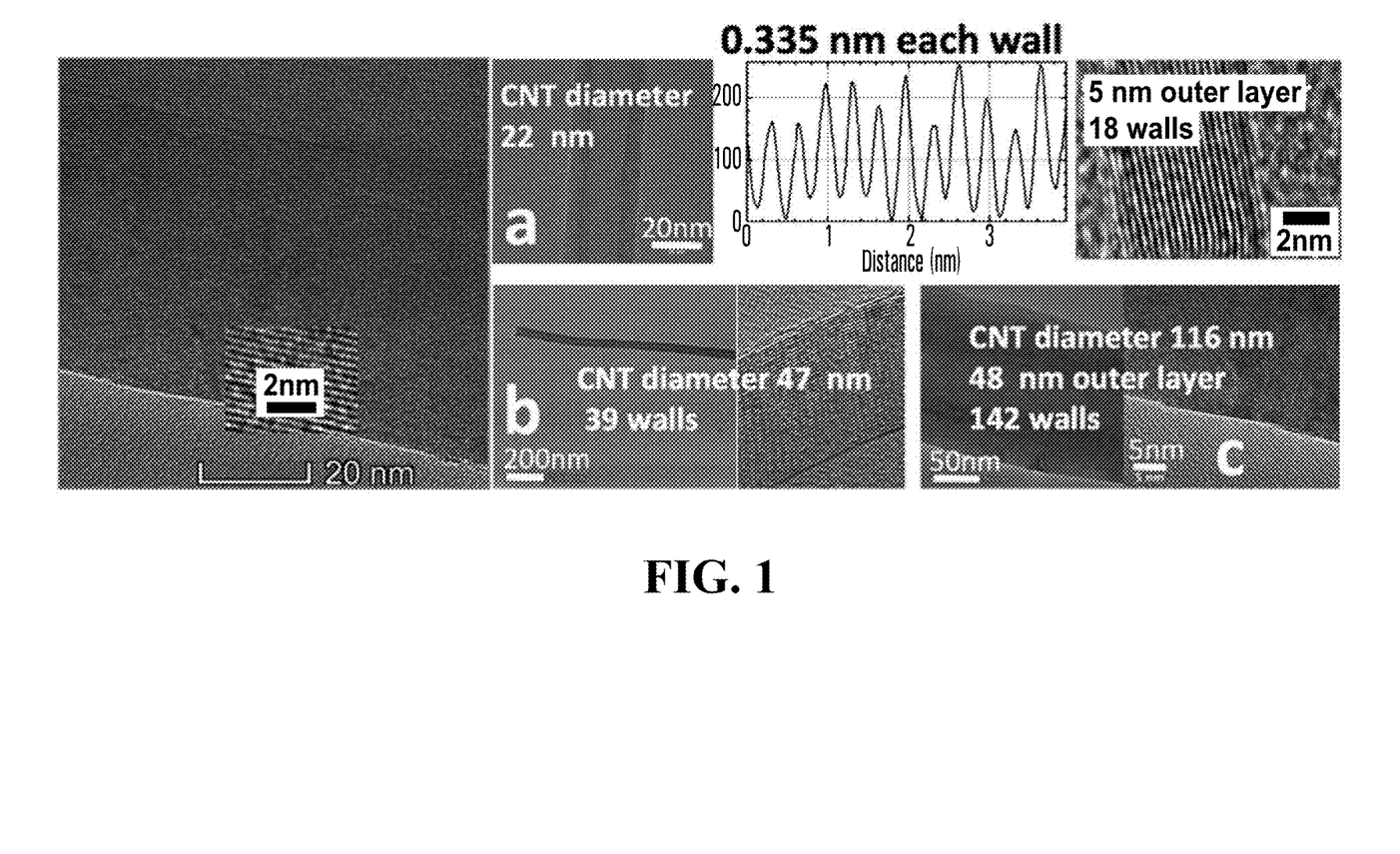
Figure 2:
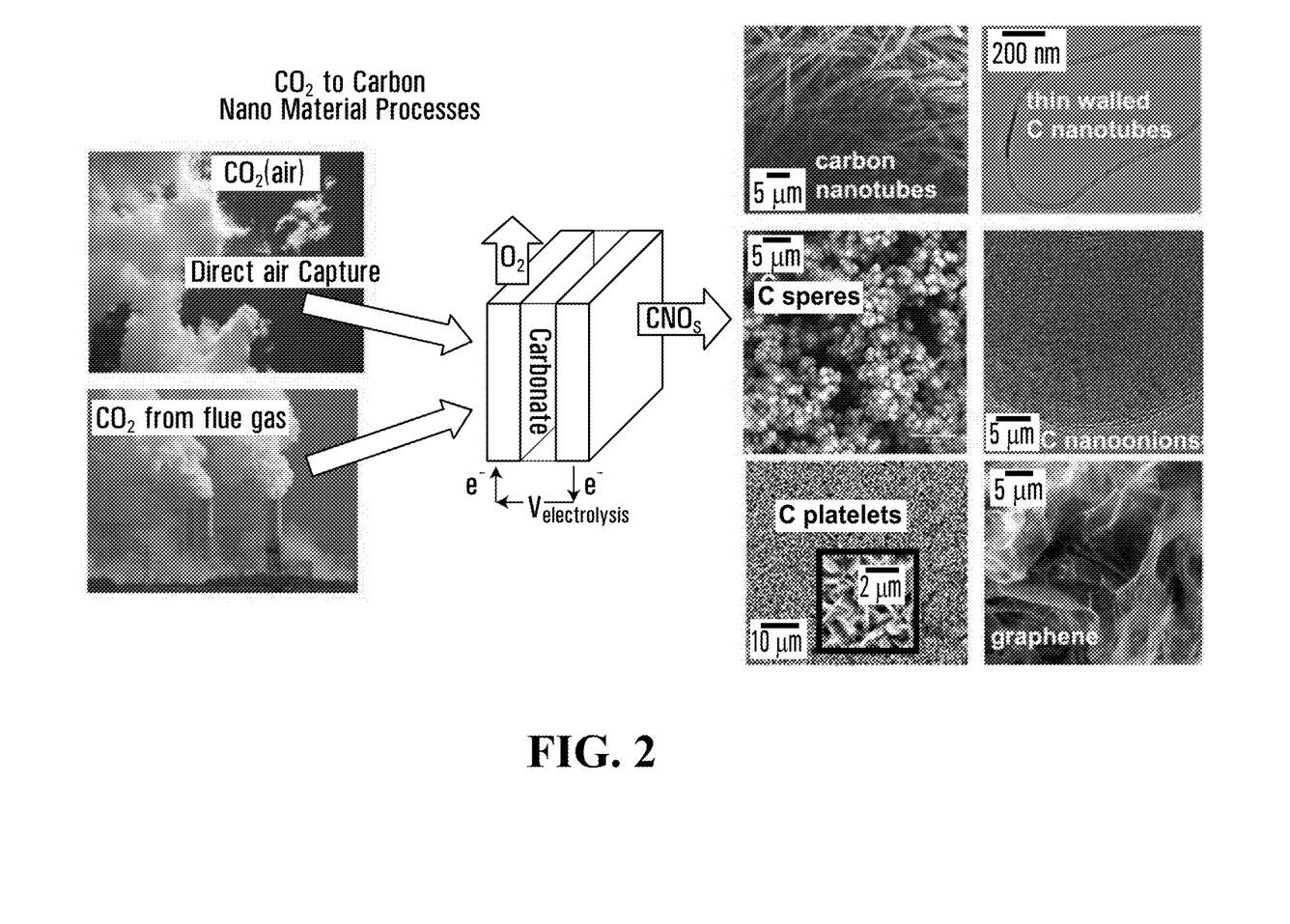
FIG. 2 is a schematic representing an electrosynthesis process for making carbon nanomaterials from $CO_2$ in a molten carbonate electrolyte, where such synthesis products in thin walled carbon nanotubes, produced according to embodiments of the present disclosure.

Transition metal nucleated growth, such as the addition of nickel powder, can lead to clearly observable CNT walls, as shown in FIG. 1. However, when these nucleation additives are purposely excluded during the synthesis, then the high yield synthesis of carbon nano-onions (as shown in FIG. 2) and graphene is accomplished. These differences in the parameters of the electrosynthesis process are but a few examples of how the electrosynthesis product can be selected for.

Many different carbon allotropes can be produced by molten splitting of $CO_2$. The wide-range of CNM morphologies observed show the potential for tuning the product for uses in many different useful products.

The electrolytic splitting of $CO_2$ in molten carbonate electrodes can be conducted with a wide range of cathode materials including iron, steels, nickel, nickel alloys, Monel, copper and brass. The diameter of the CNTs grown on copper or on brass cathodes may be similar.

As shown in FIG. 1, CNTs with concentric walls that are separated by about 0.335 nm, which are typical of the distinctive one-atom thick separation of multiple graphene layers have been observed. FIG. 1 demonstrates when the electrolyte is conducted in pure lithium carbonate, $Li_2CO_3$ an increase in CNT diameter from 22 nm to 116 nm occurs when the constant current electrolysis time is increased from 15 minutes to 90 minutes. The CNT is composed of concentric, cylindrical graphene walls spaced 0.335 nm apart.

Alongside the increased diameter is an increase in the number of concentric CNT walls on each of the inner sides of the CNT increase from about 18 to about 142 graphene layers. In pure lithium carbonate, during a 4-hour constant electrosynthesis process, rather than 1.5 hours, the CNT continues to grow and, on average, the thicker walled CNT diameter ranges from about 100 to about 160 nm.

The embodiments of the present disclosure provide a system, a composition and a method for synthesizing thin-walled CNTs. The transformation may occur at high yield and high coulombic efficiency of the 4-electron reduction of $CO_2$ in a molten carbonate electrolyte medium, which may or may not comprise a diameter-limiting component. Any source of gas that comprises $CO_2$ may be used in the systems and methods or with the compositions disclosed herein. For example, environmental air, emission gases from various industrial plants or chemical reactors, power generating plants, steam generation facilities, or pyrolysis reactors may provide a source of $CO_2$ gas.

The embodiments of the present disclosure relate to the electrochemical conditions that result in converting $CO_2$ gas into solid thin-walled CNMS, including thin-walled carbon nanotubes (CNTs). For the purposes of this discussion, thin-walled CNTs are CNTs with a diameter of less than about 100 nm and there are approximately 3 cylindrical graphene layers per nm within the CNT wall. In some embodiments of the present disclosure, thin-walled CNTS are CNTS with a diameter of less than: about 99 nm, about 75 nm, about 60 nm, about 45 nm, about 30 nm, about 18 nm, about 10 nm, about 6 nm, about 3 nm or less than about 1 nm. In some embodiments of the present disclosure, the thin-walled CNTs have an average diameter of: between about 35 nm and about 85 nm, between about 15 nm and about 65 nm, between about 3 nm and about 35 nm, between about 1 nm and about 3 nm or between about 85 nm and about 99 nm.

Some embodiments of the present disclosure relate to a system that provides for an electrosynthesis process to occur for generating a thin-walled CNM product. The system comprises a pair of electrodes, a cathode and an anode that define an inter-electrode space, which may also be referred to as an electrolysis space, which can receive and contain an electrolyte media. The system also includes a source of electric current, a source of a carbon input, a source of heat and a case to contain the electrodes and the electrolyte media. In some embodiments of the present disclosure, the system further comprises a diameter-limiting component that participates in the electrosynthesis process to limit the growth of the CNM product.

In some embodiments of the present disclosure, the cathode is formed as planar structure, a wire structure a screen, a porous structure, a conductive plate, a flat or folded shim, a sheet, a coiled structure or the cathode can form at least part of the inner sides of the case. The cathode can be formed of various conductive materials that reflect the need for variation of the nucleation point and the CNM product that forms on the cathode. Such cathode forming materials include, but are not limited to: any conductive material, galvanized (zinc coated) steel, titanium, graphite, iron, an alloy that comprises copper and zinc, Monel (Ni 400, a Ni/Cu alloy), Inconel, stainless steel, iron, Nichrome, pure Cu, and brass alloys may also be suitable.

In some embodiments of the present disclosure, the anode is formed as a planar structure, a wire structure, a screen, a porous structure, a conductive plate, a flat or folded shim, a coiled structure or the anode can form at least part of the inner side walls of the case. The anode can be formed of various conductive materials so that the anode may be oxygen generating or not. Such anode forming materials include, but are not limited to: any conductive material that establishes a highly stable oxide outer layer that is conducive to oxygen production during the electrolysis reactions performed according to the embodiments of the present disclosure, Ni, Ni alloys, galvanized (zinc coated) steel, titanium, graphite, iron, and a wide variety of metal which establish a highly stable oxide outer layer that is conducive to oxygen production. Examples of suitable materials for forming the anode include Nickel Alloy 36 (nickel without chromium, but with iron), Nichrome (nickel chromium based alloys) including stainless steels such as SS 304 or SS 316, and inconel alloys, such as Inconel 600, 625, and 718, alloy C-264, or Nichromes such as Chromel A, B or, as the co-nucleation of the alloy components are known to produce high quality CNTs. Binary and ternary transition metal nucleation agents that include, but are not limited to: Ni, Cr, Sn, In, Fe, and Mo can also effect CNM product growth.

In some embodiments of the present disclosure, a transition metal may be added on the anode, which can be dissolved from the anode to migrate through the electrolyte media onto the cathode. The added transition metal can function as a nucleating agent, which may be selected from nickel, iron, cobalt, copper, titanium, chromium, manganese, zirconium, molybdenum, silver, cadmium, tin, ruthenium, zinc, antimony, vanadium tungsten, indium, gallium, or non-transition metals such as germanium or silicon, or a mixture thereof. The transition metal may also be introduced as a dissolved transition metal salt to the electrolyte directly to migrate onto the cathode. It is also possible to add the transition metal nucleating agent directly onto the cathode.

The cathode and anode may be aligned substantially parallel to each other within the case, such as a stainless steel case or a case made of substantially pure or pure alumina. The case may be made of any material that is suitable to contain the molten electrolyte media and to sustain the temperatures achieved by the system. The electrodes may be oriented in any orientation, including but not limited to substantially horizontally or substantially vertically, but spaced apart from each other so as to define the inter-electrode space therebetween. In some embodiments of the present disclosure, the inter-electrode space is between about 0.1 cm and about 10 cm. In some embodiments of the present disclosure, the inter-electrode space is about 1 cm. As will be appreciated by those skilled in the art, the dimensions of the inter-electrode space will be dictated by the scale of the system, such as the size of each electrode, the plenum defined within the case, the amount of electric current applied and combinations thereof.

The source of electric current can be any source of an alternating current or a direct current, either constant or not, that provides a current density of at least about 0.001 A/cm$^2$. In some embodiments of the present disclosure, the current density provided between the electrodes is at least 0.003 A/cm$^2$, 0.01 A/cm$^2$, 0.03 A/cm$^2$, 0.1 A/cm$^2$, 0.3 A/cm$^2$, 1.0 A/cm$^2$, 3.0 A/cm$^2$, 10 A/cm$^2$ or greater. The power for the source of electric current may be any power source or combination of power sources, including electrical power sources, solar power sources and the like.

The source of heat can be any source of heat increases the temperature within the space within the case to a temperature that causes the electrolyte media to transition to a molten phase. For example, the source of heat can achieve a temperature within the case of between about 500° C. and about 850° C. or higher. In some embodiments of the present disclosure, the heating achieves a temperature between about 700° C. and about 80° C., between about 720° C. and about 790° C., or between about 750° C. and about 780° C. In some embodiments of the present disclosure, the heating achieves a temperature of 749-750° C., 751-752° C., 753-754° C., 755-756° C., 757-758° C., 759-760° C., 761-762° C., 763-764° C., 765-766° C., 767-768° C., 769-770° C., 771-772° C., 773-774° C., 775-776° C., 777-778° C., or 779-780° C. In some embodiments of the present disclosure, the temperature within the case can be increased to about 800° C. or hotter. In some embodiments of the present disclosure, the source of heat is provided by, or is supplemented by, the exothermic reaction of $CO_2$ absorption and conversion to carbonate (mass transfer from the gas phase to the solid phase product), or an overpotential of applied electrolysis current.

The source of a carbon input may be any source of carbon including $CO_2$. For example, environment air may provide a $CO_2$ source. Emission gases from various industrial plants or chemical reactors may provide a $CO_2$ source. For example, power generating plants, steam generation facilities, or pyrolysis reactors may emit $CO_2$. $CO_2$ emitted from these types of systems or in the production of the high carbon footprint substance may also be used as a $CO_2$ source. In addition, the $CO_2$ product of the combustion or transformation of fossil fuels for heating, transportation, and carbon products such as polymers and plastics can also be sources of $CO_2$. The case is configured to receive the carbon input, such as $CO_2$, within the inter-electrode space.

In some embodiments of the present disclosure, the electrolyte media may comprise a carbonate that can be heated by the heat source until it transitions to a molten phase. Conveniently, CNMs produced from a molten carbonate by electrolysis can be produced with a relatively low carbon footprint and even a negative carbon footprint—because $CO_2$ is consumed as a reactant—and a relatively low cost, as compared to carbon nanomaterials produced by other conventional techniques such as chemical vapor deposition (CVD) synthesis, flame synthesis, or plasma synthesis. For example, the carbonate may be a lithium carbonate or lithiated carbonate. Molten carbonates, such as a lithium carbonate $Li_2CO_3$, which has a melting point of 723° C., or lower melting point carbonates such as $LiBaCaCO_3$, having a melting point of 620° C., when containing oxide that is a result of electrolysis, such as exemplified, but not limited by, in equation 2, or when mixed with highly soluble oxides, such $Li_2O$ and BaO, sustain rapid absorption of $CO_2$ from the atmosphere or the exhaust $CO_2$. Suitable carbonates may include alkali carbonates and alkali earth carbonates. Alkali carbonates may include lithium, sodium, potassium, rubidium, cesium, or francium carbonates, or mixtures thereof. Alkali earth carbonates may include beryllium, magnesium, calcium, strontium, barium, or radium carbonates, or mixtures thereof. In some embodiments of the present disclosure, the electrolyte can be a mixed composition for example, a mix of alkali carbonates and alkali earth carbonates and one or more of an oxide, a borate, a sulfate, a nitrate, a chloride, a chlorate or a phosphate.

Some embodiments of the present disclosure provide a method for producing a thin-walled CNM product. The method comprises the steps of heating an electrolyte media to obtain a molten electrolyte; disposing the molten electrolyte between an anode and a cathode in a cell; applying an electrical current to the cathode and the anode in the cell; and, limiting the diameter of the CNM product that grows within the cell. The method may further comprise collecting a thin-walled CNM from the cathode of the cell.

In some embodiments of the present disclosure, the method may be performed using the system described herein above.

The step of limiting the diameter of the CNT in the cell may be achieved by any suitable means. In some embodiments, the step of limiting the diameter is achieved by utilizing an electrolyte medium that includes components that act to restricts, controls or limits growth of CNTs produced therein, such a component referred to herein as a diameter-limiting component. For example, the electrolyte medium may be made by pre-mixing an electrolyte with and a diameter-limiting component, adding the diameter-limiting component to the molten carbonate electrolyte or combinations thereof.

As used herein, the term "diameter-limiting component" refers to a chemical component that can be a constituent of the electrolyte medium and that contributes to controlling the diameter of the CMN product obtained from the electrosynthesis methods disclosed herein. In some embodiments of the present disclosure, the diameter-limiting component comprises a metaborate salt, an alkali oxide, or a combination thereof. Any suitable metaborate salt or alkali oxide may be used. In one embodiment of the present disclosure, the metaborate salt is calcium metaborate. In another embodiment, the metaborate salt is formed in situ, for example through a reaction between boric acid and calcium oxide. In another embodiment, the diameter-limiting component comprises lithium oxide. In another embodiment, the diameter-limiting component comprises calcium metaborate, boric acid combined with calcium oxide, lithium oxide, or a combination thereof.

The diameter-limiting component may be added to the electrolyte media in a suitable quantity. For example, in some embodiments of the present disclosure, the diameter-limiting component is added to the electrolyte media in an amount of about 0.01 molal to about 5.0 molal or higher. In some embodiments of the present disclosure, the diameter-limiting component is added to the electrolyte media in an amount of about 0.03 molal to about 3 molal, in an amount of about 0.1 molal to about 2 molal, or 0.5 molal to about 1.0 molal. As used herein, the term "molal" refers to one mole of the diameter-limiting component per one kilogram of the electrolyte medium. In other embodiments of the present disclosure, the diameter-limiting component is added in an amount of about 0.01 molal, 0.03 molal, 0.1 molal, 0.2 molal, 0.4 molal, 0.5 molal, 0.51-0.52 molal, 0.52-0.53 molal, 0.53-0.54 molal, 0.54-0.55 molal, 0.55-0.56 molal, 0.56-0.57 molal, 0.57-0.58 molal, 0.58-0.59 molal, 0.59-0.60 molal, 0.60-0.61 molal, 0.61-0.62 molal, 0.62-0.63 molal, 0.63-0.64 molal, 0.64-0.65 molal, 0.65-0.66 molal, 0.66-0.67 molal, 0.67-0.68 molal, 0.68-0.69 molal, 0.69-0.70 molal, 0.70-0.71 molal, 0.71-0.72 molal, 0.72-0.73 molal, 0.73-0.74 molal, 0.74-0.75 molal, 0.75-0.76 molal, 0.76-0.77 molal, 0.77 to 0.78 molal, 0.78-0.79 molal, 0.79-0.80 molal, 0.80-0.81 molal, 0.81-0.82 molal, 0.82-0.83 molal, 0.83-0.84 molal, 0.84-0.85 molal, 0.85-0.86 molal, 0.86-0.87 molal, 0.87-0.88 molal, 0.88-0.89 molal, 0.89-0.90 molal, 0.90-0.91 molal, 0.91-0.92 molal, 0.92-0.93 molal, 0.93-0.94 molal, 0.94-0.95 molal, 0.95-0.96 molal, 0.96-0.97 molal, 0.97-0.98 molal, 0.98-0.99 molal, or 0.99-1.0 molal. In one preferred embodiment of present disclosure, the diameter-limiting component is added in an amount of about 0.67 molal.

Some embodiments of the present disclosure provide that under the same electrolysis conditions to produce boron-doped CNTs, the addition of 7.7 wt % calcium metaborate to a lithium carbonate electrolyte media produces unusually thin walled (22 to 42 nm diameter) uniform CNTs consisting of about 25 concentric, cylindrical graphene walls at a high yield of >90% CNTs.

Of the metaborate salts, and their molten phase counterparts, sodium metaborate has been most studied, likely because of its use in certain formulations of glass. To a lesser extent calcium borate, $CaB_2O_4$ or $CaO.B_2O_3$, has also been studied. The boron in calcium metaborate has a ratio Ca to B to O ratio of 1:2:4, whereas the ratio in calcium borate, common name Gersely borate, $Ca_3(BO_3)_2$ is 1:2/3:2.

In another embodiment, the step of limiting the diameter of the CNT comprises limiting the electrolysis charge by limiting the electrolysis time, limiting the electrolysis current density or a combination thereof.

In some embodiments, the step of limiting the diameter of the CNT in the cell comprises employing a short electrolysis-duration. As used herein, the term "short electrolysis-duration" refers to the amount time an electrical current is applied to the cathode and the anode in the cell. In some embodiments, the short electrolysis-duration is between about 5 minutes and about 120 minutes. For example, the short electrolysis-duration may be between about 15 minutes and about 90 minutes. In some embodiments of the present disclosure, the short electrolysis-duration is 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes 85 minutes, or 90 minutes. In a preferred embodiment, the short electrolysis-duration is about 15 minutes.

In some embodiments of the present disclosure, the electrical current is applied at a low electrolysis current density.

In some embodiments of the present disclosure, the low electrolysis current density is between 0.001 A/cm² and 0.5 A/cm2. In other embodiments of the present disclosure, the low electrolysis current density is between 0.003 A/cm² and 0.4 A/cm², the low electrolysis current density is between 0.01 A/cm² and 0.3 A/cm², the low electrolysis current density is between 0.02 A/cm² and 0.2 A/cm², the low electrolysis current density is between 0.05 A/cm² and 0.15 A/cm², or about 0.1 A/cm².

In some embodiments of the present disclosure, the electrical current is applied at a high electrolysis current density. In these embodiments, the high electrolysis current density is between about 0.5 A/cm² and about 0.9 A/cm². In a preferred embodiment, the high electrolysis current density is about 0.6 A/cm².

In an embodiment, the present disclosure provides a method for producing a thin walled carbon nanomaterial, the method comprising: heating a carbonate electrolyte to obtain a molten carbonate electrolyte; disposing the molten carbonate electrolyte between an anode and a cathode in a cell; applying an electrical current to the cathode and the anode in the cell; selecting a nanomaterial morphology; and, limiting a diameter of the carbon nanomaterial in the cell.

As used herein, the term "selecting a nanomaterial morphology" refers to any step that contributes to controlling the morphology of the electrosynthesis CNM product. In some embodiments of the present disclosure, the selected morphology of the CNM may include the following CNM morphologies: carbon nano-onions, carbon nano-scaffolds, carbon nano-spheres, carbon-nano-helices, carbon nano-platelets, graphene or combinations thereof. In some embodiments of the present disclosure, the step of selecting a nanomaterial morphology can result in an electrosynthesis CNM product that is partially, mostly, substantially all or all of a single CNM morphology. For example, the step of selecting a nanomaterial morphology can produce an electrosynthesis CNM product that is partially, mostly, substantially all or all of one of: carbon nano-onions, carbon nano-scaffolds, carbon nano-spheres, carbon-nano-helices, carbon nano-platelets or graphene.

In some embodiments of the present disclosure, the step of selecting a nanomaterial morphology comprises applying the electrical current to the cathode and anode as an alternating current (AC). For example, an AC electrolysis current may select for a CNM product with a nano-onion morphology.

In another embodiment, the step of selecting the nanomaterial morphology comprises adding ZnO to the molten carbonate electrolyte and applying an AC electrolysis current, which may select for a CNM product with a graphene platelet morphology.

In another embodiment, the step of selecting the nanomaterial morphology comprises adding MgO to the molten carbonate electrolyte and selecting an electrical current for a hollow carbon nano-sphere product.

Figure 3:
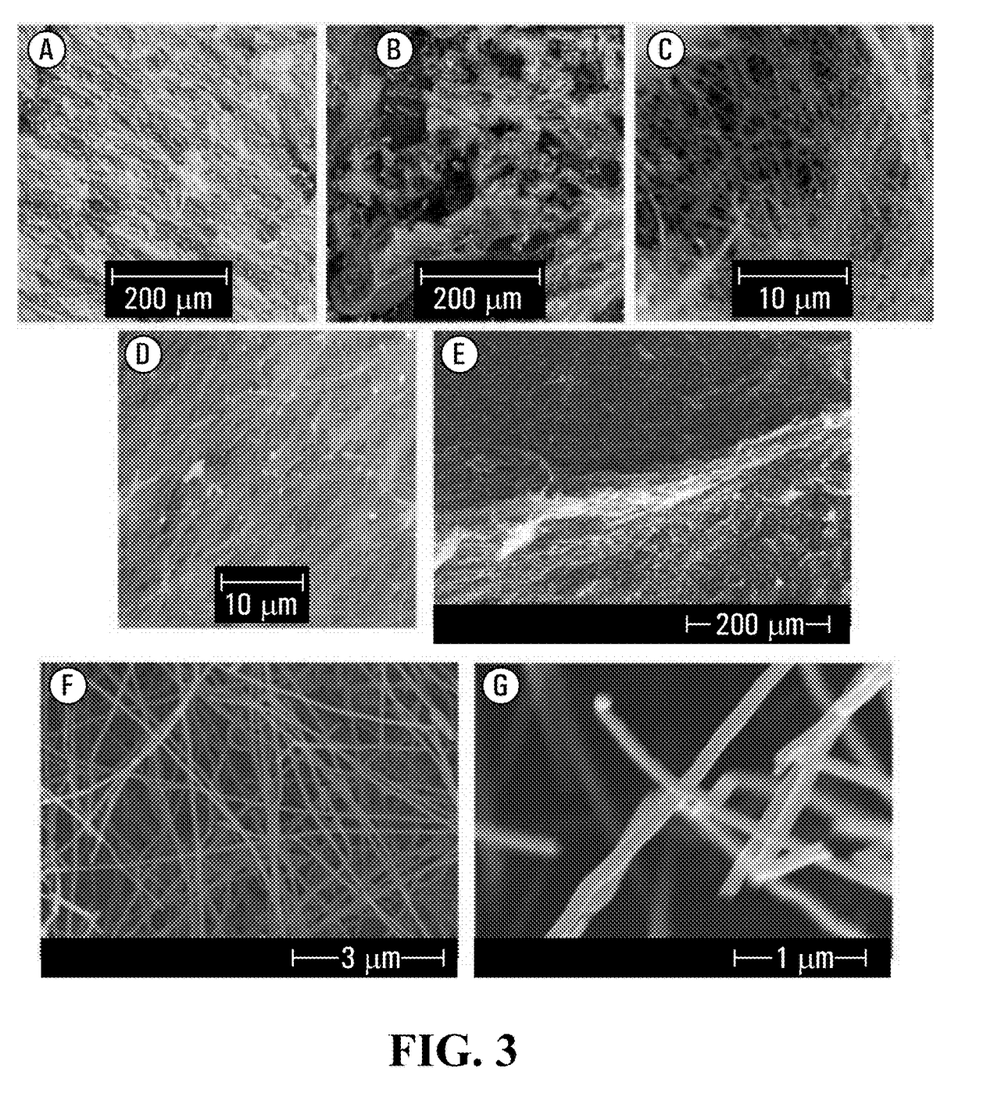

Some embodiments of the present disclosure provide that the electrolyte media composition can affect the CNT diameter and/or wall thickness. For example, in some embodiments of the present disclosure, the addition of 2 wt % $Li_2O$ to the electrolyte may produce thinner, highly uniform (50 to 80 nm diameter) thin-walled CNTs, consisting of about 75 concentric, cylindrical graphene walls. The product can be produced at high yield (the cathode product consists of >98% CNTs). FIG. 3 shows scanning electron microscopy (SEM) images of thin-walled CNTs grown by the addition of low concentrations of lithium oxide to the electrolyte according to the methods of the present disclosure. The CNTs were electrosynthesized in 770° C. $Li_2CO_3$ with 2 wt % lithium oxide ($Li_2O$) electrolyte (0.67 moles of $Li_2O$ per kg $Li_2CO_3$) using a nickel alloy anode and brass cathode. A relatively low current density of 0.1 A/cm² was applied (for example, aluminum smelting by electrolysis of aluminum oxide typically occurs at 0.5-0.6 A/cm²), and $CO_2$ from the air (direct air capture) was sufficient to renew the electrolyte in accord with Equation (3) and to maintain the electrolyte level. At this low current density, $CO_2$ without pre-concentration was found to be directly absorbed by the air (direct air capture) to renew and sustain the carbonate electrolyte. Concentrated $CO_2$ was neither required nor added.

EXAMPLES

The preparation of thin walled nanotubes of the present disclosure is illustrated further in the following examples, which are offered to illustrate the invention and not to be construed in any way as limiting the scope of the present disclosure.

Example 1

The electrolyte media was pre-mixed using lithium carbonate ($Li_2CO_3$, 99.5%), lithium oxide ($Li_2O$, 99.5%), calcium oxide (CaO, 99.5%) and boric acid ($H_3BO_3$, 99.9%) are used to make the electrolyte media composition in specific ratios, described further herein below and heated until molten. Sheet metal electrodes were vertically immersed into the molten electrolyte media, in contrast to prior studies that used horizontally aligned anodes and cathodes comprised of wires coiled into a disk, such as the electrosynthesis products shown in FIG. 1.

A 0.25-inch-thick Muntz brass sheet was used as the cathode and 0.04-inch-thick Nichrome (chromel A) sheet was used as the anode. 0.01 to 1-inch-thick Muntz brass sheet 0.01 to 1-inch-thick Nichrome are also effective. The cathode was aligned (sandwiched) between two series connected anodes and spaced 1 cm from each of the anodes. A spacing between 0.25 cm to 10 cm is also effective. The electrolyte and electrodes were contained in a rectangular stainless steel 304 case.

A constant current of 0.1 A/cm² was applied to the vertically immersed planar electrodes for a constant time of 4 hours with an electrolysis temperature of 770° C. This differs from the experiment described in FIG. 1, which was at a constant current of 0.2 A/cm² for different short intervals of time (15, 30 or 90 minutes). Lower or higher current densities and shorter or higher electrolysis times can also be effective for making thin-walled CNTs.

The raw product was collected from the brass cathode after the experiment and cooled down, followed by an aqueous wash procedure. The washed carbon product was separated by vacuum filtration and dried overnight in a 60° C. oven, yielding a black powder product.

The coulombic efficiency of electrolysis is the percent of applied, constant current charge that was converted to carbon determined as:

$$100\% \times C_{experimental}/C_{theoretical} \qquad (4),$$

wherein $C_{experimental}$ is measured by the mass of washed carbon product removed from the cathode and $C_{theoretical} = (Q/nF) \times (12.01$ g C mol-1), where Q is the time integrated charged passed during the electrolysis, F is the Faraday constant (96485 As $mol^{-1}$ $e^-$), and n=4 e–$mol^{-1}$ reduction of tetravalent carbon.

Samples were are analyzed by PHENOM Pro Pro-X SEM, FEI Teneo LV SEM, and by FEI Teneo Talos F200X TEM.

Example 2

CNTs were electrosynthesized in 770° C. lithium carbonate ($Li_2CO_3$, 99.5%) with 2 wt % lithium oxide ($Li_2O$, 99.5%) electrolyte (0.67 moles of $Li_2O$ per kg $Li_2CO_3$) using a nickel alloy anode and brass cathode. A relatively low current density of 0.1 A/cm² was applied and $CO_2$ from the air (direct air capture) was sufficient to renew the electrolyte in accord with Equation (3) and maintain the electrolyte level. Concentrated $CO_2$ was neither required nor added. Lower or higher current densities and shorter or higher electrolysis times can also be effective for making thin-walled CNTs.

$$CO_2(gas) \rightarrow C(CNT) + O_2(gas) \qquad (3)$$

After the synthesis, the extracted cathode was cooled and the solid product readily peeled off the cathode and washed to remove excess electrolyte prior to microscopy.

FIG. 3 shows a scanning electron microscope (SEM) image of the thin-walled CNTs, demonstrating that the electrolyte media composition can affect the CNT diameter. The scale bars in the SEM images of FIG. 3A-3E are respectively 200 μm, 200 μm, 10 μm, and 10 μm. The scale bars in the TEM images of FIG. 3E-3G are respectively at 200 μm, 3 μm, and 1 μm.

Panel B of FIG. 3 is an SEM image of an electrosynthesis product removed from the rear side (i.e. not facing the anode) of the cathode. In particular, a piece of the multilayer graphene sheet which first forms on the cathode, and from which the CNT growth is evident in a manner consistent with the tip growth mechanism. The product was found to have approximately 98% uniform CNTs as determined by visual inspection of multiple SEM images and the transmission electron microscope (TEM) images.

Over repeated experiments using the 2 wt % $Li_2O$ in $Li_2CO_3$ electrolyte media, the coulombic efficiency was consistently found to be between 97% to 100%. Lower concentrations of lithium oxide resulted in thicker diameter and CNTs, and greater than 2 wt % added lithium oxide did not further decrease the observed thickness.

The diameter of representative samples of the CNTs was measured with the nano-caliper function of the Phenom SEM and varied from ~50 to 80 nm, or approximately half the diameter of CNTs electrosynthesized in pure $Li_2CO_3$.

Example 3

In this example, the addition of calcium metaborate to the electrolyte was studied. It has previously been demonstrated that with the addition of 5 to 10 wt % lithium metaborate to a lithium carbonate electrolyte media used in $CO_2$ electrolysis, boron dopes the CNTs increasing their electrical conductivity ten-fold. It had also been shown the addition of alkali earth metal carbonates to a lithium electrolyte have a substantial effect on the carbon nanomaterial electrolysis product. For example, the addition of magnesium carbonate prevented the formation of CNTs, and the addition of calcium carbonate inhibited, and diminished, but allowed the formation of CNTs resulting in a yield of only ~15% of the product as CNTs. Interestingly, it was observed that those CNTs which did form in the Ca/Li mixed carbonate electrolyte had much thinner walls than those synthesized in pure lithium carbonate.

Calcium metaborate used in this example was synthesized by the addition of calcium oxide and boric acid:

$$CaO + 2H_3BO_3 \rightarrow CaO \cdot B_2O_3 + 3H_2O \qquad (5)$$

Specifically, 0.2 moles of calcium oxide and 0.4 moles of boric acid were added to 300 g $Li_2CO_3$ and heated at 770° C. overnight to release all water as steam. The molten mixture was 0.67 molal (7.7 wt %) calcium metaborate in $Li_2CO_3$, and was used as an electrolyte in the electrolysis of $CO_2$ with a 6 cm by 7 cm brass cathode sandwiched between nichrome anodes.

The electrolysis approached 100% coulombic efficiency as measured according to Equation 4, and the electrosynthesis product consisted of 2-6 μm length CNTs. The CNT product was found to be marginally less pure (90% yield of CNTs) than the 0.67 molal lithium oxide synthesis of Example 2.

Figure 4:
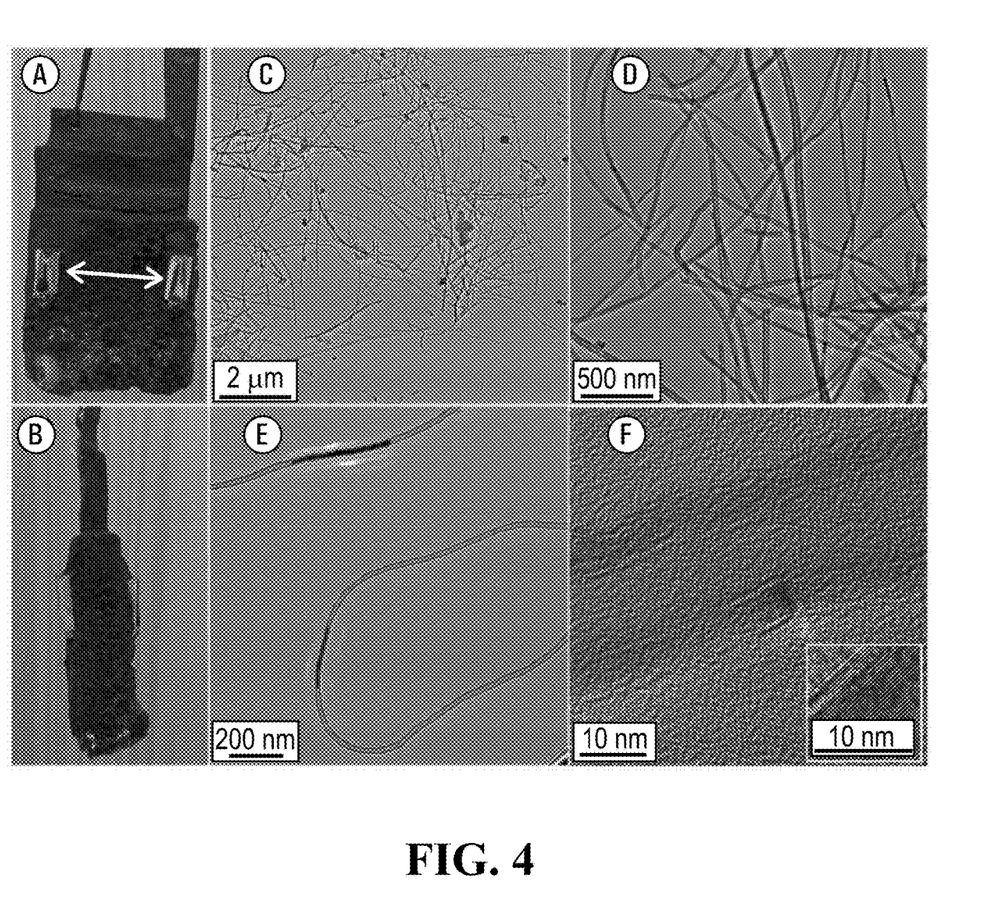

The cathode, extracted and cooled after a 4 hour electrolysis is shown on the left side of FIG. 4. White cylinders in FIG. 4A (shown by double sided arrow) are alumina placed on the cathode to prevent shorting with the anode. The scale bars in the TEM images of FIG. 4 are respectively at 2 μm (FIG. 4C), 500 nm (FIG. 4D), 200 nm (FIG. 4E), and 10 nm (FIG. 4F).

The diameter of representative samples of the calcium borate in lithium carbonate electrosynthesized CNTs was found to be considerably smaller than in similar pure lithium carbonate or lithium carbonate with lithium oxide electrolytes, and varied from ~22 to 42 nm.

Figure 5:
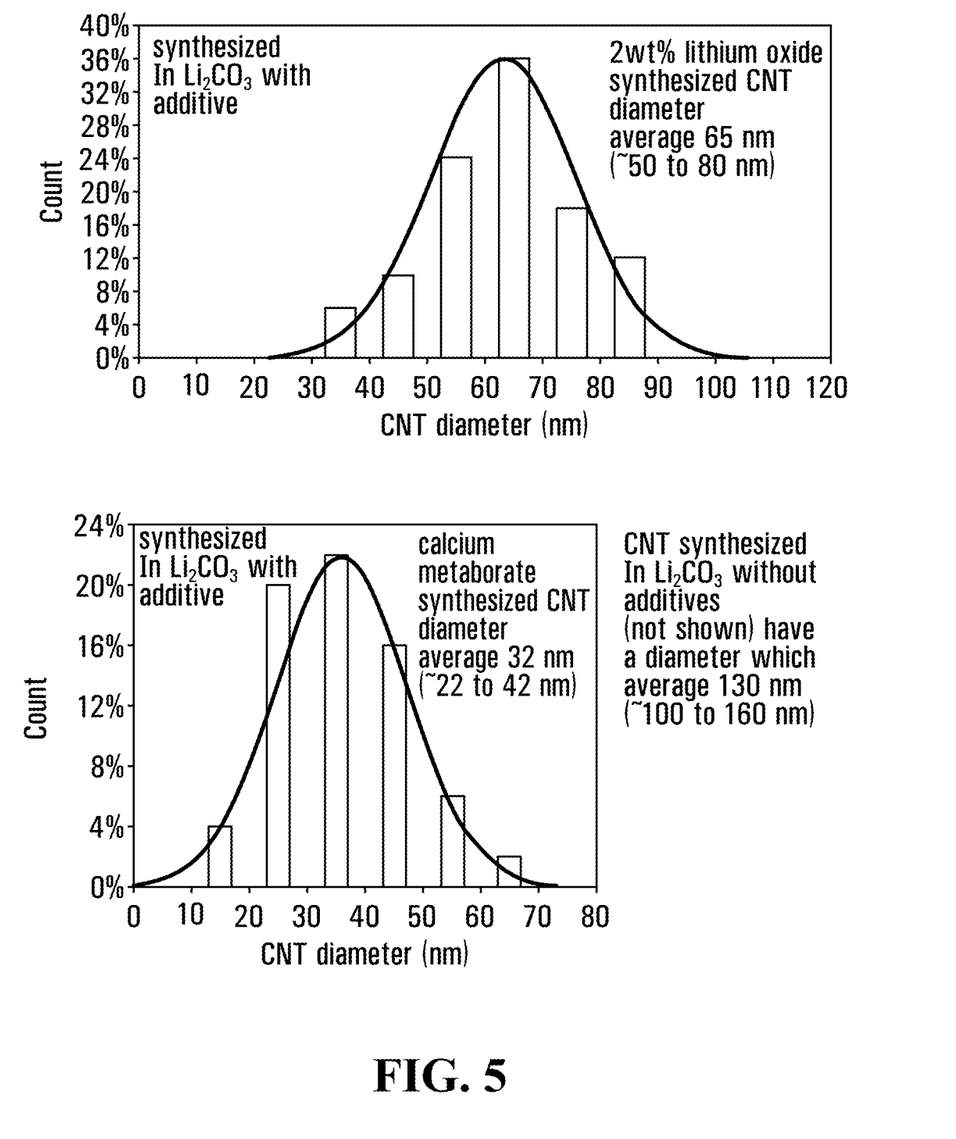
FIG. 5 shows an upper panel and a lower panel, wherein the upper panel shows a distribution of CNT diameter size by count compared between the CNT product formed from lithium carbonate electrolyte medium containing Li₂O as a diameter-limiting component; and, wherein the bottom panel shows a distribution of CNT diameter size by count compared between the CNT product formed from a lithium carbonate electrolyte medium containing calcium metaborate as a diameter-limiting component, according to embodiments of the present disclosure.

The distribution of CNT diameter size by count is compared in FIG. 5 between the CNT product formed from lithium carbonate electrolyte, either containing 0.67 m $Li_2O$ (top panel), or 0.67 m $CaO \cdot B_2O_3$ (bottom panel).

The average CNT diameter after a 4 hour electrolysis was 130 nm in $Li_2CO_3$ without additives, 65 nm with 0.67 m $Li_2O$, and 32 nm with 0.67 m $CaO \cdot B_2O_3$.

Example 4

In this example, additional carbon nanotube diameter-limiting components were demonstrated as measured by Raman spectroscopy. Specifically, the combination of a high constant electrolysis current density, J, with the addition of either (i) lithium oxide to the molten carbonate electrolyte, (ii) calcium oxide to the electrolyte, (iii) borate to the electrolyte, or (iv) any combination of (i) to (iii).

The Raman spectrum of carbon nanotubes includes two sharp peaks ~1350 cm−1 and ~1580 cm−1, which correspond to the disorder-induced mode (D band) and the high frequency E2g first order mode (G band), respectively.

The ratio of the intensity of the D to G peak (RD/G) yields a useful measure. A higher R indicates thicker and/or more disordered CNTs; clean, single wall carbon nanotubes (SWCNTs) tend to have an R<0.1; and clean, multiwalled carbon nanotubes (MWCNTs) tend to have 0.2<R<0.4.

MWCNTs were synthesized in pure lithium carbonae by electrolysis at J=0.1 A/cm², and were found to have a measured diameter of 130 nm and R=0.4. MWCNTs were also synthesized in lithium carbonate with 2 wt % added lithium oxide by electrolysis at J=0.1 A/cm², which were found to have a measured diameter of 65 nm and R=0.3. At a high J=0.6 A/cm², MWCNTs synthesized in lithium carbonate with 2 wt % added lithium oxide by electrolysis had a measured smaller diameter of 50 nm and R=0.2.

Not all additives lead to a decrease in R and MWCNTs synthesized with 1.3 wt % $Fe_2O_3$ exhibited a measured R of 0.8. However, at this high J value, the further addition of lithium oxide with boric acid, or calcium oxide with boric acid, to the electrolyte results in even smaller R (R<0.2).

Example 5

In this example, additional CNT diameter-limiting components are demonstrated. Specifically, the combination of limited duration (constant) electrolysis with the addition of either (i) lithium oxide to the electrolyte, (ii) borates to the electrolyte, or (iii) calcium oxide to the electrolyte, or (iv) any combination of (i) to (iii). The CNT diameter measured to be proportional to the constant current electrolysis time and it was found that this proportionality was retained with other diameter limiting factors such as added lithium oxide, borates, or calcium oxide. For example, a thin-walled CNT grown at constant current electrolysis for 15 minutes was found to be approximately ⅙ of the diameter of a CNT grown at constant current electrolysis for about 90 minutes. Even thinner walled CNTs grow after only 5 minutes of electrolysis, and thicker walled CNTs grow after over 90 minutes of electrolysis.

What is claimed is:

1. A system for making a thin-walled carbon nanomaterial product (CNM), the system comprising:
   a. an anode;
   b. a cathode;
   c. an inter-electrode space that is defined between the anode and the cathode;
   d. a carbonate electrolyte media positionable within the inter-electrode space,
   e. a source of current for applying a current density is at least 0.01 A/cm² across the electrodes;
   f. a source of heat configured to heat the electrolyte media to a temperature so as to create a molten electrolyte media;
   g. a diameter-limiting component that is mixable with the electrolyte media, wherein the diameter-limiting component is configured to provide an oxidative and/or conductive environment within the inter-electrode space, and wherein the diameter-limiting component comprises calcium metaborate, boric acid combined with calcium oxide, or a combination thereof; and
   h. a source of carbon for introducing a carbon input into the inter-electrode space.

2. The system of claim 1, wherein the diameter-limiting component is calcium metaborate.

3. The system of claim 1, wherein the diameter-limiting component is a combination of boric acid and calcium oxide.

4. The system of claim 1, wherein the diameter-limiting component is present in amount of about 0.01 to about 5 molal with respect to the carbonate electrolyte media or the molten carbonate electrolyte media.

5. The system of claim 1, wherein the anode and cathode are positioned substantially parallel to each other and aligned substantially vertically within the system.

6. The system of claim 5, wherein the anode is a Nichrome sheet that is about 0.01 to 1 inch thick and the cathode is a brass sheet that is about 0.01 to 1 inch thick.

7. The system of claim 6, wherein the anode is two series connected anodes and the cathode is positioned therebetween separated for each anode by about 0.1 to about 4 inches.

8. The method of claim 7, wherein the step of limiting the diameter of the CNM comprises mixing the diameter-limiting component with the molten carbonate electrolyte media.

9. The method of claim 7, wherein the diameter-limiting component is calcium metaborate.

10. The method of claim 7, wherein the diameter-limiting component comprises a combination of boric acid and calcium oxide.

11. The system of claim 1, wherein the source of carbon is carbon dioxide.

12. A method for producing a thin-walled carbon nanomaterial (CNM), the method comprising:
   a. heating a carbonate electrolyte media to obtain a molten carbonate electrolyte contained within a cell;
   b. disposing the molten carbonate electrolyte between an anode and a cathode;
   c. applying an electrical current to the cathode and the anode in the cell; and
   d. limiting a diameter of the thin-walled CNM by mixing a diameter-limiting component with the electrolyte media or the molten carbonate electrolyte, wherein the diameter-limiting component comprises calcium metaborate, boric acid combined with calcium oxide, or a combination thereof, wherein the step of limiting the diameter of the thin-walled CNM comprises:
      i. adding about 0.01 to about 5 molal of a diameter-limiting component comprising calcium metaborate, boric acid combined with calcium oxide, lithium oxide, or a combination thereof to the carbonate electrolyte media or to the molten carbonate electrolyte media;
      ii. modulating the electrical current to a low electrolysis current density;
      iii. providing an oxidative environment within the inter-electrode space;
      iv. providing a conductive environment within the inter-electrode space; or
      v. any combination thereof.

13. The method of claim 12, further comprising a step of selecting a nanomaterial morphology.

14. The method of claim 12, wherein the step of limiting the diameter of the CNM comprises mixing the diameter-limiting component with the carbonate electrolyte media.

15. The method of claim 12, wherein the diameter-limiting component is added in amount of about 0.01 to about 5 molal with respect to the carbonate electrolyte media or the molten carbonate electrolyte media.

16. The method of claim 12, wherein the step of limiting the diameter of the CNM produced comprises modulating the electrical current to a low electrolysis current density.

17. The method of claim 12, wherein the step of limiting the diameter of the CNM produced further comprises a step of stopping the electrical current between about 5 minutes and about 90 minutes.

18. The method of claim 12, further comprising a step of collecting the thin-walled carbon nanomaterial product from the cathode.

19. The method of claim 12, wherein the electrolysis current is alternating current.

20. The method of claim 19, further comprising a step of adding zinc oxide to the cell.

21. An electrolyte media for making a thin-walled carbon nanomaterial product, the electrolyte media comprising:
   a. a carbonate; and
   b. a diameter-limiting component, wherein the diameter-limiting component is configured to provide an oxidative and/or conductive environment for making the thin-walled carbon nanomaterial product, and wherein the diameter-limiting component comprises calcium metaborate, boric acid combined with calcium oxide, or a combination thereof.

22. The electrolyte media of claim 21, wherein the carbonate is an alkali carbonate, an alkali earth carbonate or combinations thereof.

23. The electrolyte media of claim 22, wherein the electrolyte media further comprises an oxide, a borate, a sulfate, a nitrate, a chloride, a chlorate, a phosphate or combinations thereof.

24. The electrolyte media of claim 21, wherein the diameter-limiting component is calcium metaborate, boric acid combined with calcium oxide, or a combination thereof.

25. The electrolyte media of claim 21, wherein the diameter-limiting component is present in an amount of about 0.01 to about 5 molal with respect to the carbonate.

26. The electrolyte media of claim 21 in a molten state.

27. The electrolyte media of claim 21, wherein the diameter-limiting component is calcium metaborate.

28. The electrolyte media of claim 21, wherein the diameter-limiting component comprises a combination of boric acid and calcium oxide.

\* \* \* \* \*

UNITED STATES PATENT AND TRADEMARK OFFICE
CERTIFICATE OF CORRECTION

PATENT NO. : 11,434,574 B2  
APPLICATION NO. : 17/243510  
DATED : September 6, 2022  
INVENTOR(S) : Stuart Licht Page 1 of 1

It is certified that error appears in the above-identified patent and that said Letters Patent is hereby corrected as shown below:

In the Claims

Please replace Column 13, Line 64 through Column 13, Line 67 with the following:

8. The system of claim 7, wherein mixing the diameter-limiting component with the molten carbonate electrolyte media is configured to limit the diameter of the thin-walled CNM.

Please replace Column 14, Line 1 through Column 14, Line 5 with the following:

9. The system of claim 7, wherein the diameter-limiting component is calcium metaborate.

10. The system of claim 7, wherein the diameter-limiting component comprises a combination of boric acid and calcium oxide.

Signed and Sealed this  
Tenth Day of September, 2024

Katherine Kelly Vidal  
*Director of the United States Patent and Trademark Office*